United States Patent [19]
Kato et al.

[11] Patent Number: 5,655,216
[45] Date of Patent: Aug. 5, 1997

[54] MOBILE COMMUNICATION SYSTEM PROVIDING FOR COEXISTENCE OF BOTH A CELLULAR AUTOMOBILE TELEPHONE SYSTEM AND A MICRO CELLULAR SYSTEM

[75] Inventors: Osamu Kato; Masaki Hayashi, both of Yokohama, Japan

[73] Assignee: Matsushita Electric Industrial Co., Ltd., Osaka, Japan

[21] Appl. No.: 254,588

[22] Filed: Jun. 6, 1994

[30] Foreign Application Priority Data

Jun. 10, 1993 [JP] Japan ................................ 5-163895
Jun. 15, 1993 [JP] Japan ................................ 5-167292
Jun. 15, 1993 [JP] Japan ................................ 5-167293

[51] Int. Cl.⁶ ........................................... H04Q 7/00
[52] U.S. Cl. ........................................... 370/337; 455/449
[58] Field of Search ........................... 455/33.1, 33.4, 455/54.1, 53.1, 56.1, 34.1, 34.2; 379/58, 59; 375/205; 370/95.3, 95.1

[56] References Cited

U.S. PATENT DOCUMENTS

| | | | |
|---|---|---|---|
| 5,038,399 | 8/1991 | Bruckeet | 455/54.1 |
| 5,193,091 | 3/1993 | Crisler et al. | 455/33.1 |
| 5,212,805 | 5/1993 | Comroe et al. | |
| 5,365,571 | 11/1994 | Rha et al. | 455/33.1 |
| 5,396,645 | 3/1995 | Huff | 455/33.4 |
| 5,483,666 | 1/1996 | Yamada et al. | 455/33.1 |
| 5,483,667 | 1/1996 | Faruque | 379/59 |

FOREIGN PATENT DOCUMENTS

| | | |
|---|---|---|
| 4200031A | 7/1992 | Japan . |
| 2252699 | 8/1992 | United Kingdom . |
| 9204796A1 | 3/1992 | WIPO . |
| 9302509 | 2/1993 | WIPO ........................ 455/33.4 |
| 9321699A1 | 10/1993 | WIPO . |

OTHER PUBLICATIONS

Chih-Lin et al, "A Microcell/Macrocell Cellular Architecture for Low-and High-Mobility Wireless Users", GLOBECOM 91, vol. 2, 2 Dec. 1991–5 Dec. 1991, Phoenix, US, pp. 1006–1011.

Swales, et al, "A Comparison of CDMA Techniques for Third Generation Mobile Radio Systems", 43rd IEEE Vehicular Technology Conference, 18 May 1993–20 May 1993, Secaucus, US, pp. 424–427.

*Primary Examiner*—Reinhard J. Eisenzopf
*Assistant Examiner*—Doris To

[57] ABSTRACT

A mobile communication system is provided for increasing the capacity for personal stations and ensuring a radio channel for use with a micro cellular system irrespective of the environment in which the system is installed. In the mobile communication system which allows the coexistence of a cellular automobile telephone system and a micro cellular system, communications in the cellular automobile telephone systems and the micro cellular systems are performed in a digital form, and a personal station accessing to each of these systems is connected thereto by using a time-division multiplex access mode or a code division multiplex access mode. Since the time-division multiplex access mode or code division multiplex access mode is used, a radio channel at the same frequency can be used by a plurality of personal stations. Thus, the capacity of the system can be increased for personal stations without extending a used frequency band.

2 Claims, 5 Drawing Sheets

MOBILE COMMUNICATION SYSTEM PROVIDING FOR COEXISTENCE OF BOTH A CELLULAR AUTOMOBILE TELEPHONE SYSTEM AND A MICRO CELLULAR SYSTEM

BACKGROUND OF THE INVENTION

The present invention relates to a mobile communication apparatus which allows the coexistence of a cellular automobile telephone system and a micro cellular system, and more particularly to a mobile communication apparatus which provides the systems with an increased capacity for personal stations.

A mobile communication apparatus which allows the coexistence of a cellular automobile telephone system and a micro cellular system is disclosed in JP-A-4-200031, and its investigation for commercialization is still under progress.

The mobile communication apparatus now in a practical phase employs an analog communication form and a frequency division multiplex access mode which assigns radio channels at different frequencies to respective subscribers requesting a call.

As shown in FIG. 1, this apparatus accesses to the cellular automobile telephone system when a personal station (PS) 16 is transported by a car or the like which is running at a high speed, or to the micro cellular system when a personal station is carried by a person who is moving in a crowded area such as a building, an amusement quarter, or the like at a low speed. A system to be accessed is manually or automatically switched.

In the cellular automobile telephone system, a public switched telephone network (PSTN) 11 is connected to a personal station 16 through a mobile telephone switching office (MTSO) 12 and a base station (BS) 13 placed under the command of the mobile telephone switching office 12. Generally, a predetermined number of radio channels are previously assigned to the base station 13, so that the mobile telephone switching office 12 selects an unused radio channel from the assigned radio channels prior to communications to establish a communication line between the base station 13 and the personal station 16.

In the cellular automobile telephone system, a service area is divided into small zones corresponding to respective base stations. Between base stations 13 which are located too remotely to interfere with each other, the same frequency is repeatedly used to cover a wider area with a high frequency utilization efficiency.

On the other hand, in the micro cellular system, the public switched telephone network 11 is connected to a personal station 16 through a control unit (CU) 14 and a fixed station (FS) 15 placed under the command of the control unit 14. The control unit 14 utilizes a cellular scanner (CS) 19 to search for radio channels which are being used by neighboring base stations of the cellular automobile telephone system, and assigns one of the unused radio channels to a communication channel for use between the fixed station 15 and the personal station 16 to establish a communication line therebetween.

In FIG. 1, an area covered by the base station 13 of the cellular automobile telephone system is indicated by a solid line circle 17, and an area covered by the fixed station 15 of the micro cellular system is indicated by a broken line circle 18.

In this manner, the conventional mobile communication apparatus improves the frequency utilization efficiency by sharing the same frequency band with the cellular automobile telephone system and the micro cellular system.

The conventional mobile communication system, however, implies problems as follows:

(a) Since the conventional mobile communication system employs an analog communication form, the frequency utilization efficiency cannot be highly improved, so that the number of available personal stations will not be significantly increased.

(b) If the micro cellular system is installed at an open place such as the upper stories of a building, radio waves from the cellular automobile telephone system will easily reach the micro cellular system even from remote locations. Therefore, it is quite difficult to find a radio channel which is free from interference with these radio waves.

SUMMARY OF THE INVENTION

The present invention has been made to solve the problems mentioned above, and its object is to provide a mobile communication apparatus which is capable of improving the capacity for personal stations and of ensuring a radio channel to be used by a micro cellular system irrespective of the environment in which the system is installed.

According to the present invention, there is provided a mobile communication apparatus which allows the coexistence of a cellular automobile telephone system and a micro cellular system, wherein communications in the cellular automobile system and the micro cellular system are performed in a digital transmission form, and personal stations which access to each of these systems are connected by using a time-division multiplex access mode.

Alternatively, a code division multiplex access mode may be used in place of the time-division multiplex access mode.

Further alternatively, separate frequency bands are provided for use in the cellular automobile telephone system and the micro cellular system, respectively.

Instead, a common frequency band may be used for the cellular automobile telephone system and the micro cellular system, wherein a personal station accessing to the micro cellular system is assigned a radio channel which is not being used by a neighboring base station of the cellular automobile telephone system.

Since the time-division multiplex access mode or the code division multiplex access mode is used as described above, a radio channel at the same frequency can be used by a plurality of personal stations, so that the capacity for personal stations can be increased without extending a used frequency band.

By dividing a frequency band into one for the cellular automobile telephone system and the other for the micro cellular system, mutual interference between these systems can be eliminated. In this case, although the frequency bands used by the respective systems are narrowed due to the frequency band division, the introduction of the time-division multiplex access mode or the code division multiplex access system results in a higher capacity for personal stations than before.

Even if the frequency band is not divided for the respective systems, the respective systems are made more resistant to interference, so that a radio channel can be ensured irrespective of the environment in which the micro cellular system is installed.

DESCRIPTION OF THE PREFERRED EMBODIMENTS (Embodiment 1)

A mobile communication apparatus according to a first embodiment of the present invention employs a digital transmission form for communications with a cellular automobile telephone system and a micro cellular system.

Figure 2:
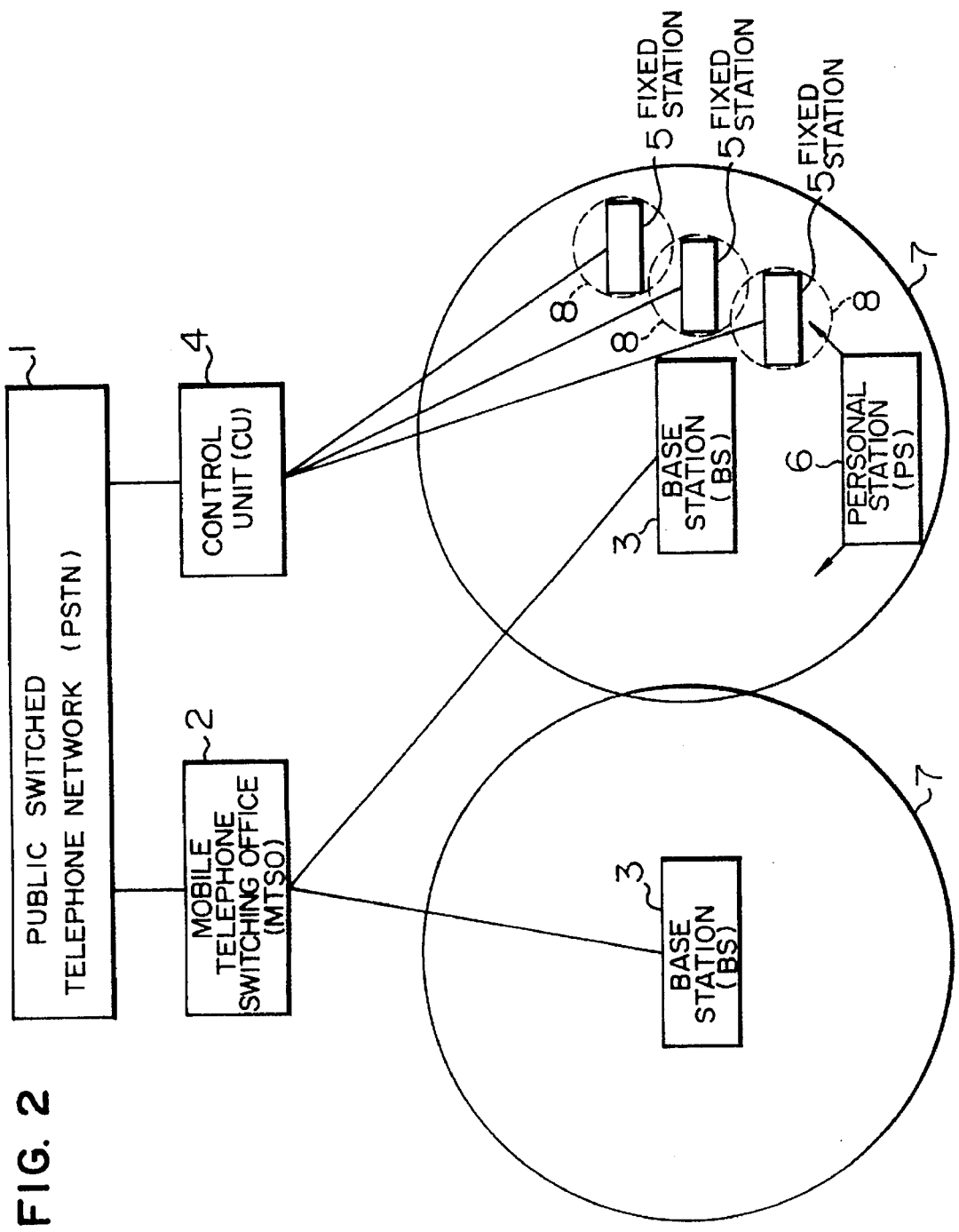
FIG. 2 is a block diagram showing a first embodiment of a mobile communication apparatus according to the present invention.

As shown in FIG. 2, in this mobile communication apparatus, the digital cellular automobile telephone system is composed of a mobile telephone switching office (MTSO) 2 connected to a public switched telephone network (PSTN). 1 and base stations (BS) 3 connected to the mobile telephone switching office 2. The digital micro cellular system is composed of a control unit (CU) 4 connected to the public switched telephone network 1 and fixed stations (FS) 5 connected to this control unit 4.

Referring further to FIG. 2, a solid line circle 7 represents an area covered by the base station 3 of the digital cellular automobile telephone system, and a broken line circle 8 represents an area covered by the fixed station 5 of the digital micro cellular system. The cover area of the base station 3 generally extends over a region, the radius of which is several kilometers, while the cover area of the fixed station 5 extends over a region, the radius of which is scores of meters The digital micro cellular system is installed in crowded areas such as buildings, underground shopping centers, and so on.

A personal station (PS) 6 accesses to the micro cellular system when it is carried by a person moving in a crowded area at a rather low speed. If the personal station 6 cannot access to the micro cellular system or if it is transported by a car running at a high speed, it accesses to the cellular automobile telephone system. This access switching is performed manually or automatically. With the automatic switching, when the personal station 6 detects that it has gone out of a service area covered by a system to which it belongs at present, it automatically begins to access to the other system.

While the digital micro cellular system and the digital cellular automobile system share the same frequency band, entrepreneurs divide the frequency band so as to assign separate bands to the respective systems in order to avoid the interference between the systems.

In both the systems, the personal station 6 is connected by a time-division multiplex access (TDMA) mode or a code division multiplex access (CDMA) mode.

The time-division multiplex access mode divides communication time and assigns the divided communication time to respective personal stations. This mode enables a plurality of personal stations to access to the system at the same carrier frequency, resulting in greatly improving the capacity of the system for personal stations.

The code division multiplex access mode in turn assigns a particular code to each channel, such that the transmission side performs the spread spectrum communication with this code to transmit a modulated carrier wave at the same frequency, and the reception side establishes the synchronization with this code to identify a target channel. This mode also enables a plurality of personal stations to access to the system using the same carrier frequency by assigning different codes to the plurality of personal stations, thus improving the capacity of the system for available personal stations.

The assignment of the time-division communication time or a unique code to each personal station may be set by the mobile telephone switching office 2 or the control unit 4 in response to the generation of a call. Alternatively, this assignment may be fixedly set to each personal station before a call is generated.

The mobile communication apparatus of this embodiment can be made basically free from interference between the digital cellular automobile telephone system and the digital micro cellular system by the configuration described above. Therefore, the assignment of a radio channel to each personal station may be accomplished only in consideration of interference within the respective systems.

Further, the employment of a digital form instead of an analog form enables the time-division multiplex access mode or the code division multiplex access mode to be introduced as an access mode for the mobile communication apparatus. Therefore, even if an available frequency band is divided into two for the digital cellular automobile telephone system and the digital micro cellular system, and accordingly each divided frequency band becomes narrower, the capacity for available personal stations does not decrease but rather increases. Particularly, the time-division multiplex access mode can significantly improve this capacity.

As a result, each system becomes more resistant to interference, so that if the number of personal stations available in the digital cellular automobile telephone system is maintained as before, the number of zones, for which a frequency is repeatedly utilized, can be reduced from conventional seven-zone repetition to four-zone repetition.

In the code division multiplex access mode, on the other hand, each personal station 6 is previously assigned a unique code so as not to repetitively use the same code for neighboring personal stations, so that the digital micro cellular system can be flexibly and readily installed or moved without requiring to monitor an interference level in the neighborhood or the like.

Further, by separately providing a frequency band for the digital cellular automobile telephone system and a frequency band for the digital micro cellular system, even if the digital micro cellular system is installed in the upper stories of a building or the like, a radio channel to be assigned can be found, thus solving the aforementioned problem inherent in the conventional mobile communication system.

Incidentally, while the mobile communication apparatus of this embodiment can reduce the number of repeated frequency utilization from conventional seven-zone repetition to four-zone repetition, as described above, if the seven-zone repetition is maintained as before, a used frequency band may not be divided into two for the digital cellular automobile telephone system and the digital micro cellular system. In this case, the digital micro cellular system may use a frequency band common to the digital cellular automobile telephone system, monitor radio channels used by neighboring base stations of the digital cellular automobile telephone system, and assign an unused radio channel to a personal station which has initialized a call.

Also in this case, since the respective systems are more resistant to interference, the mobile communication apparatus of this embodiment will be free from the situation that a digital micro cellular system installed in the upper stories of a building cannot find an unused radio channel to be assigned.

(Embodiment 2)

Figure 3:
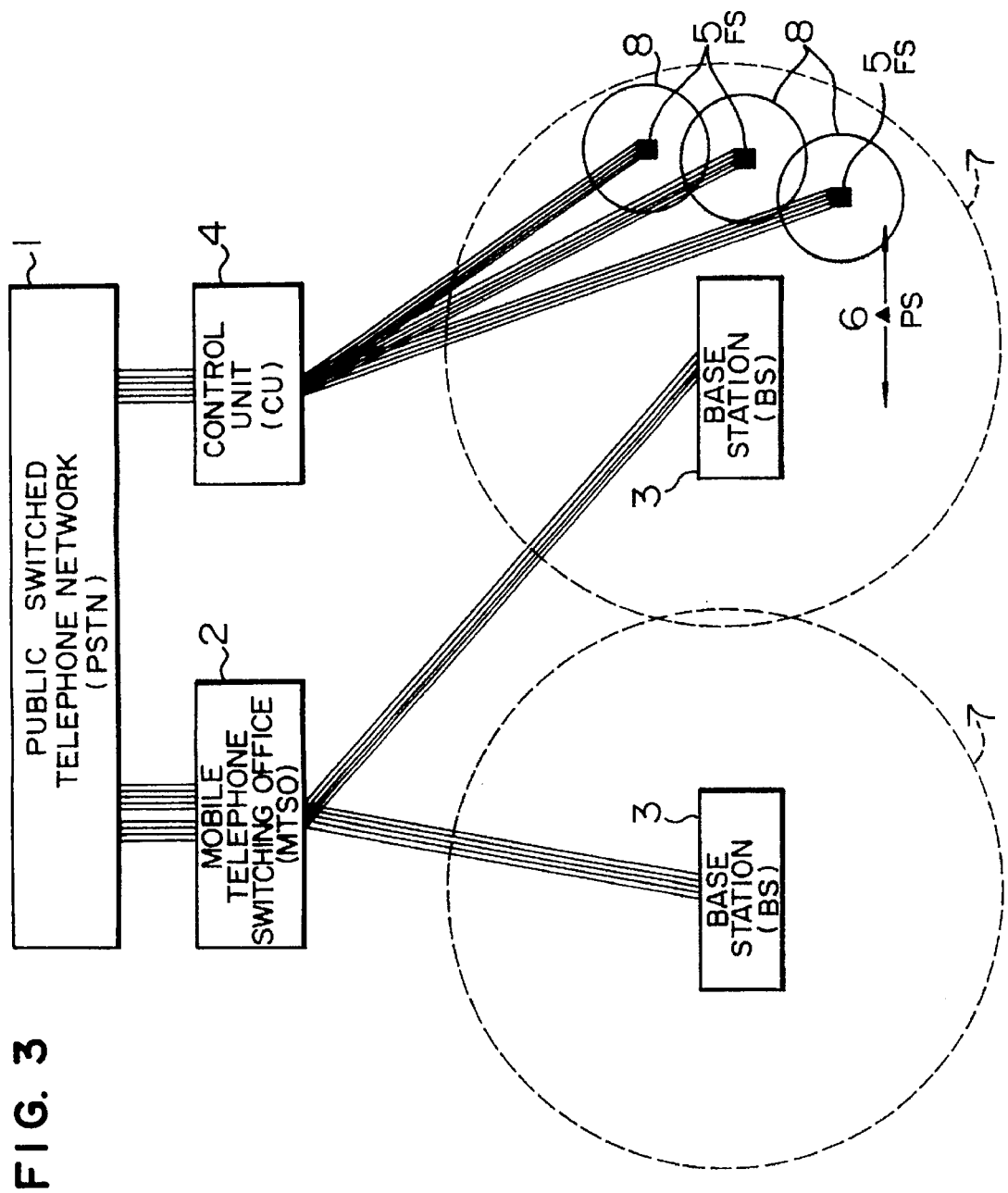
FIG. 3 is a block diagram showing a second embodiment of a mobile communication apparatus according to the present invention.

In a mobile communication apparatus according to this embodiment, as shown in FIG. 3, a cellular automobile telephone system is composed of a mobile telephone switching office (MTSO) 2 and base stations (BS) 3 each connected to this mobile telephone switching office 2 by wire, while a micro cellular system is composed of a control unit (CU) 4 and fixed stations (FS) 5 each connected to the control unit 4 by wire. A personal station (PS) 6 can access to either of these systems by automatic or manual switching.

The personal station 6 transmits signals in a digital form between the fixed station 5 and the base station 3 (therefore, the system composed of the base stations and the mobile telephone switching office 2 is referred to as "the digital cellular automobile telephone system", and the system composed of the fixed stations and the control unit is referred to as "the digital micro cellular system").

The fixed station 5 and the base station 3 have modulation and demodulation functions by a code division multiplex access (CDMA) mode.

In the code division multiplex access mode, a particular code is assigned to each channel. The transmission side performs spread modulation for modulated waves at a carrier frequency in accordance with the codes to spread a transmitted signal over a much wider band than a bandwidth of a normal modulation for communication. The reception side performs spread demodulation in accordance with the codes to reproduce information. In this mode, the assignment of codes may be set in several ways to enable communications to be performed simultaneously through multiple channels using the same frequency.

Figure 1:
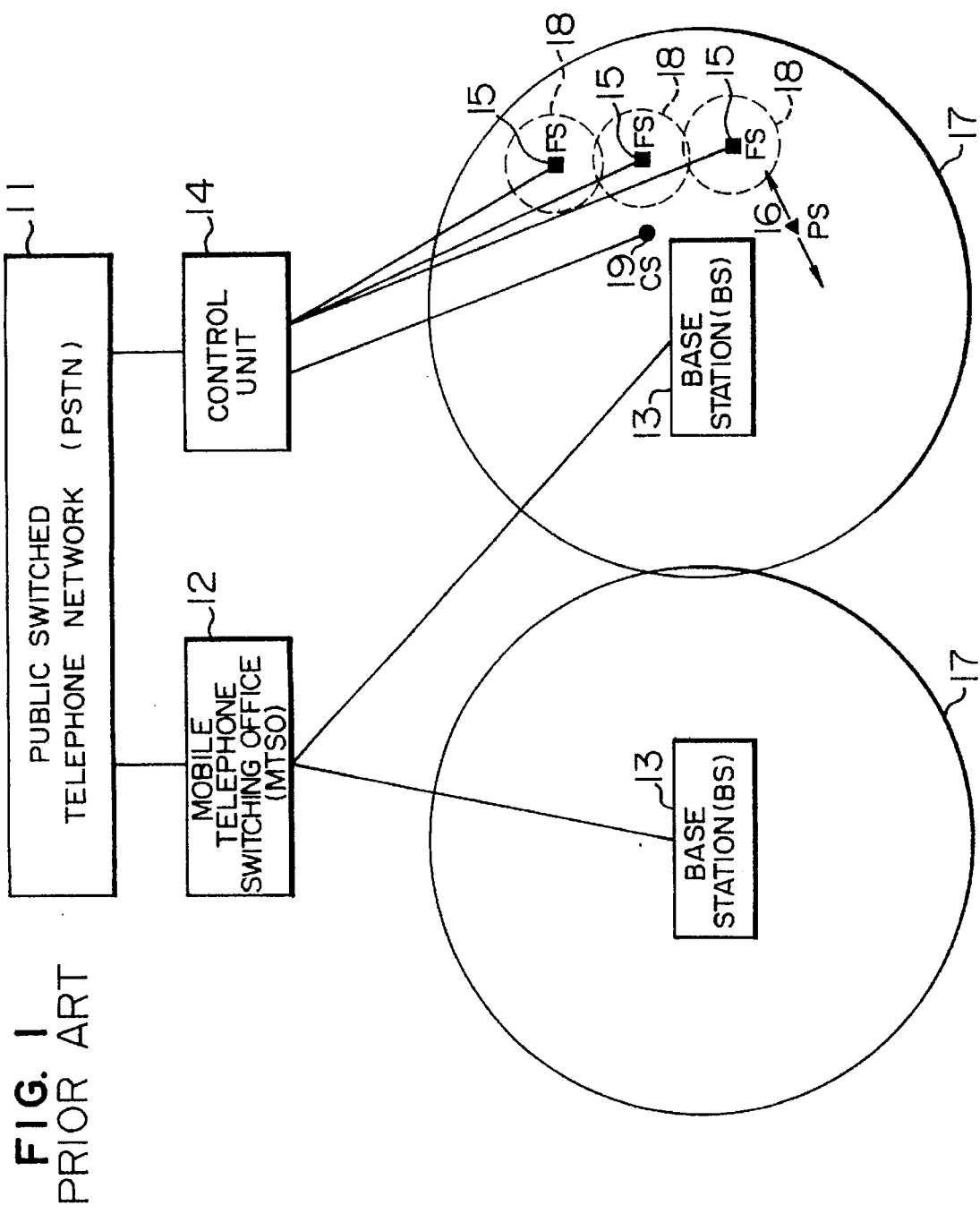
FIG. 1 is a block diagram showing a conventional mobile communication apparatus.

For this reason, one fixed station 5 can simultaneously communicate by radio in parallel with a plurality of personal stations 6 which have previously been given different codes. The fixed station 5 is connected with the control unit 4 by a plurality of cables, so that the single fixed station 5 acts as a plurality of fixed stations 15 in the conventional mobile communication apparatus (FIG. 1).

Signal transmission between the fixed station 5 and the control unit 4 is performed in the same form as the signal transmission form in the public switched telephone network 1. Therefore, the configuration and functions of the control unit 4 connected to the fixed station 5 of the digital micro cellular system and the public switched telephone network 1 are completely the same as those employed in the conventional mobile communication apparatus.

Each base station 3 of the digital cellular automobile telephone system has, as a cover area, a region as indicated by a broken line circle 7 which has the radius of several kilometers, while the fixed stations 5 of the digital micro cellular system installed in buildings, underground shopping centers, and so on each have, as a cover area, a region as indicated by a solid line circle 8 which has the radius of scores of meters.

In the mobile communication apparatus of this embodiment, a frequency band is divided into two in order to assign separate frequency bands to the digital micro cellular system and the digital cellular automobile telephone system. For this reason, interference between both the systems can be basically avoided, so that interference within each system may only be taken into account for assigning a radio channel to a personal station 6.

It will be appreciated that although the frequency bands available to the respective systems are narrowed due to the division of the original frequency band, the communication form for the personal stations 6 switched from the analog form to the digital form enables a multiplex access mode to be introduced as an access mode, so that the capacities of the respective systems for the personal stations 6 do not decrease but rather increase.

The personal station 6 accesses to the digital micro cellular system when a user carrying same is moving in a crowded region such as a building, an amusement quarter, or the like at a low speed. The personal station 6 accesses to the digital cellular automobile telephone system when it fails to access to the digital micro cellular system or when it is transported by a car which is running at a high speed. The switching to a system to be accessed is performed manually or automatically. With the automatic switching, when the personal station 6 detects that it has gone out of a service area covered by a system to which it belongs at present, it automatically begins to access to the other system.

Alternatively, the fixed station 5 and the base station 3 may be provided with modulation and demodulation functions in a time-division multiplex access (TDMA) mode in place of the modulation and demodulation functions by the code division multiplex access mode.

In the time-division multiplex access (TDMA) mode, communication time is assigned to each of the personal stations 6 in a time-division manner. This allows a plurality of personal stations 6 to communicate with the fixed station 5 or the base station 3 using the same carrier frequency, whereby the capacities of the respective systems are significantly increased for the personal stations 6.

Incidentally, instead of providing separate frequency bands used by the digital cellular automobile telephone system and the digital micro cellular system, the digital micro cellular system may be constructed to use a frequency band common to the cellular automobile telephone system and to assign a radio channel, which is not being used by a neighboring base station of the cellular automobile telephone system, to a personal station which has requested a call. In this case, a cellular scanner may be provided for monitoring radio channels currently used by base stations of the digital cellular automobile telephone system in the same way as the conventional mobile communication apparatus.

As described above, the mobile communication apparatus of this embodiment does not require a plurality of fixed stations to be installed closely, since the single fixed station 5 constituting the digital micro cellular system can be accessed in a multiplex manner by a plurality of personal stations 6. Also, in the control unit and the public switched telephone network at a rank higher than the fixed station, signals can be transmitted while maintaining a format of the signals defined in the public switched telephone network, so that the configurations and functions of these apparatuses do not have to be modified. The fixed station 5 may also be connected directly to the public switched telephone network 11.

(Embodiment 3)

In a mobile communication system according to this embodiment, communications between a personal station and a base station of a cellular automobile telephone system and a fixed station of a micro cellular system are performed by a digital transmission system.

Figure 4:
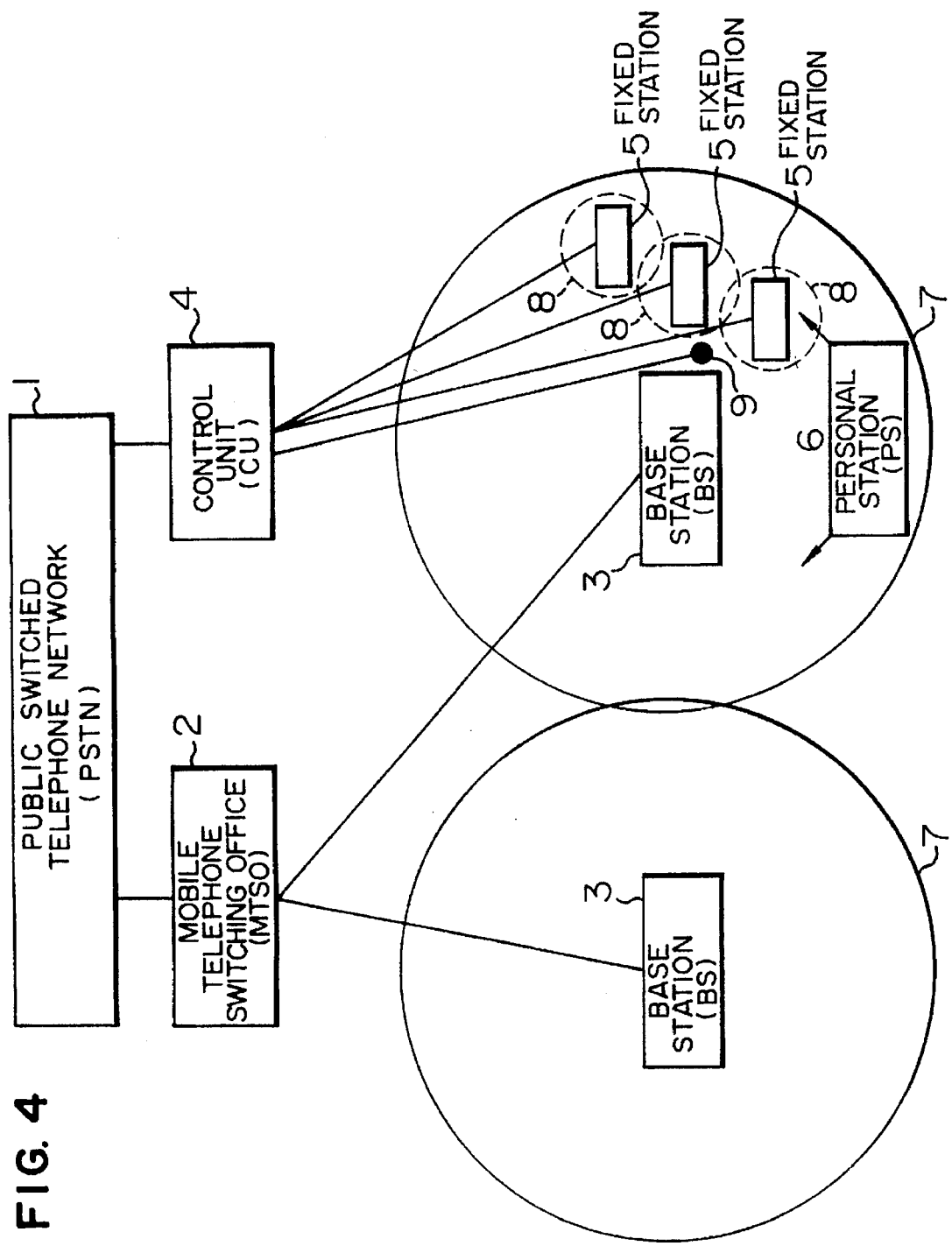
FIG. 4 is a block diagram showing a third embodiment of a mobile communication apparatus according to the present invention.

An apparatus for implementing this mobile communication system, as shown in FIG. 4, comprises a digital cellular automobile telephone system composed of a mobile telephone switching office (MTSO) 2 connected to a public switched telephone network (PSTN) 1 and base stations (BS) 3 connected to this mobile telephone switching office 2; and a digital micro cellular system composed of a control unit (CU) 4 connected to the public switched telephone network 1, fixed stations (FS) 5 connected to this control unit 4, and a cellular scanner (CS) 9 for monitoring radio channels which are used by neighboring base stations 3. A personal station (PS) 6 can access to either of these systems by manual or automatic switching.

Each base station 3 of the digital cellular automobile telephone system has, as a cover area, a region as indicated by a solid line circle 7 which has the radius of several kilometers, while the fixed stations 5 of the digital micro cellular system installed in buildings, underground shopping centers, and so on each have, as a cover area, a region indicated by a broken line circle 8 which has the radius of scores of meters.

The personal station 6 accesses to the digital micro cellular system when a user carrying the personal station 6 is moving in a crowded region such as a building, a shopping center, or the like at a low speed. The personal station 6 accesses to the digital cellular automobile telephone system when it fails to access to the digital micro cellular system or when it is transported by a car which is running at a high speed. The switching to a system to be accessed is performed manually or automatically. With the automatic switching, when the personal station 6 detects that it has gone out of a service coverage of a system to which it is currently accessing, it automatically begins to access to the other system.

The fixed station 5 and the base station 3 of the respective systems employ a time-division multiplex access (TDMA) mode for connection with the personal station 6.

In the time-division multiplex access (TDMA) mode, communication time is assigned to each of the personal stations 6 in a time-division manner. This allows a plurality of personal stations 6 to access to the respective systems by the same carrier frequency, whereby the capacities of the respective systems are significantly increased for the personal stations 6.

In each of the systems, the assignment of time-division communication time to the personal station 6, which is going to communicate, is set by the mobile telephone switching office 2 or the control unit 4 in response to the generation of a call, or fixedly set in each of the personal stations 6 prior to the generation of a call. The personal station 6 is connected to the public switched telephone network 1 through the base station 3 and the mobile telephone switching office 2 in the digital cellular automobile telephone system, and through the fixed station 5 and the control unit 4 in the digital micro cellular system.

In the mobile communication apparatus of this embodiment, since the communication form between the personal station 6 and the base station 3 or the fixed station 5 is switched from an analog form to a digital form, a time-division multiplex access mode can be introduced as an access mode for the base station 3 and the fixed station 5 to the personal station 6. As a result, the capacity for the personal stations 6 is increased in the digital cellular automobile telephone system and the digital micro cellular system.

Figure 5:
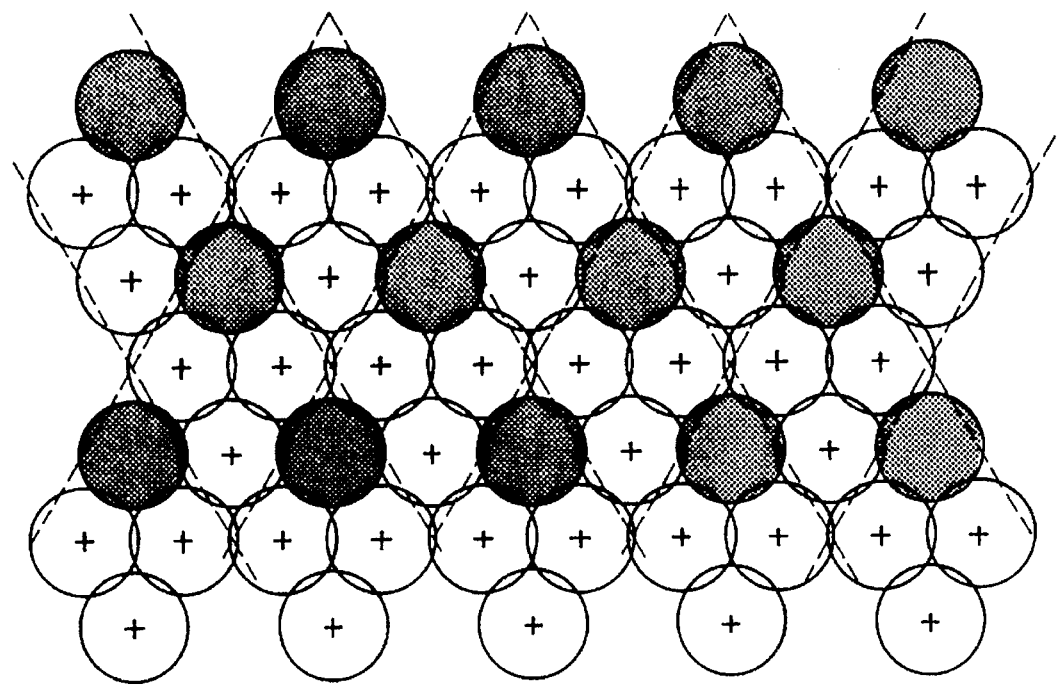
FIG. 5 is a diagram showing the configuration of a frequency repeating unit (four zones) for a cellular automobile telephone system.
Figure 6:
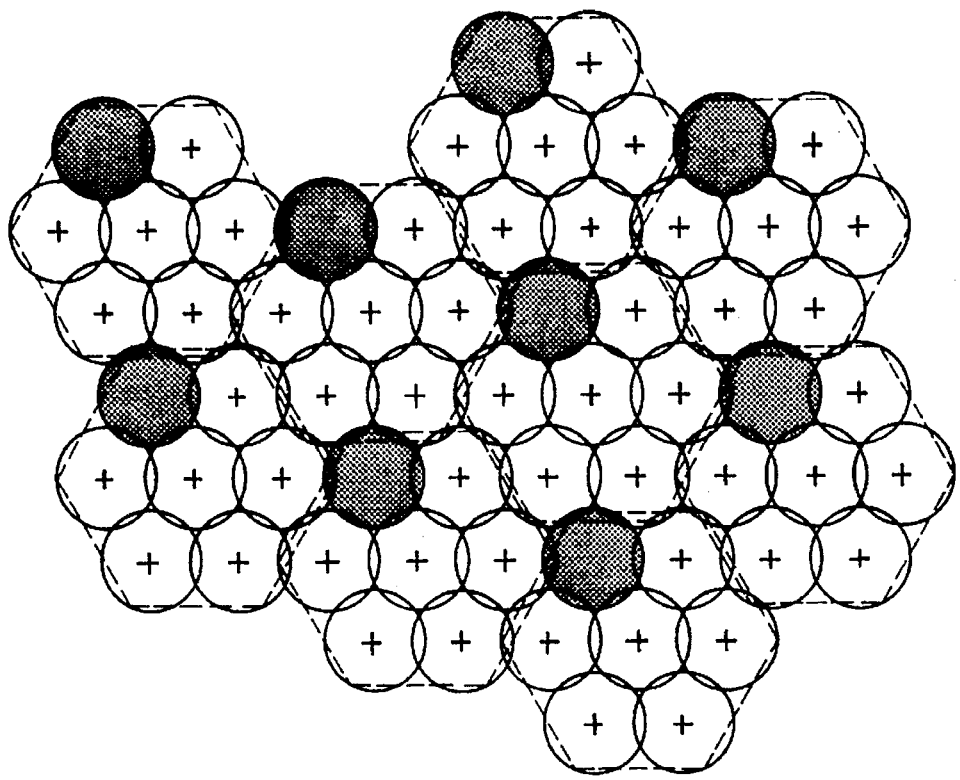
FIG. 6 is a diagram showing the configuration of a frequency repeating unit (seven zones) for a cellular automobile telephone system.

This increase in the capacity for personal stations enables the same frequency to be assigned to closer small zones in the digital cellular automobile telephone system, as shown in FIG. 5. From a technical viewpoint, the unit of frequency repetition can be reduced from conventional seven zones to four zones which are shown surrounded by a dotted line, and in theory, base stations for painted zones in the drawing can be assigned radio channels at the same frequency.

However, in the mobile communication apparatus of this embodiment, the unit of the frequency repetition in the digital cellular automobile telephone system is maintained to be seven zones as before. This means that the number of small zones included in the unit of the frequency repetition is substantially increased. Thus, in each of the small zones, radio channels can be assigned to personal stations with sufficient margin.

In the digital micro cellular system, on the other hand, the control unit 4 uses the cellular scanner 9 to search for radio channels currently used by neighboring base stations 3 of the digital cellular automobile telephone system, and selects one of unused radio channels for a communication channel between the fixed station 5 and the personal station 6.

In this case, since the unit of the frequency repletion for the digital cellular automobile telephone system is substantially extended so that the system is made more resistant to interference, it is possible to find with a much higher probability a radio channel which is free from interference with another radio channel used by the digital micro cellular system, i.e., a radio channel currently used by a neighboring digital cellular automobile telephone system. For this reason, even if the digital micro cellular system is installed at an open place such as the upper stories of a building, the system will be substantially free from the situation that no radio channel to be used can be found.

We claim:

1. A mobile communication system comprising a personal station having means for accessing both a cellular automobile telephone system and a micro cellular system, said cellular automobile telephone system covering a service area which is divided into a plurality of small zones and having a given maximum frequency utilization efficiency defined as a minimum feasible unit of frequency repetition of said small zones having a same frequency assigned thereto, and said micro cellular system covering a coverage area which is divided into a plurality of small areas all of which are located within one of said small zones, wherein:

said personal station performs communications in a digital mode;

said means for accessing connects said personal station to said cellular automobile telephone system and said micro cellular system by using a time-division multiplex access mode;

an actual unit of frequency repetition of said small zones having a same frequency assigned thereto is larger than said minimum feasible unit of frequency repetition;

a common frequency band is used by said cellular automobile telephone system and said micro cellular system; and when said personal station is accessing to said micro cellular system, said personal station is assigned a radio channel in said common frequency band, which radio channel is not currently being used by ones of said small zones which are neighbors of said personal station.

2. A mobile communication system according to claim 1, wherein said minimum feasible unit of frequency repetition is four of said small zones and said actual unit of frequency repetition is seven of said small zones.

* * * * *